United States Patent [19]
Pfund

[11] 3,802,372
[45] Apr. 9, 1974

[54] METHOD AND APPARATUS FOR OBTAINING MAXIMUM SAIL WIND VELOCITY

[76] Inventor: Charles E. Pfund, 16 Balcarres Rd., West Newton, Mass. 02165

[22] Filed: Apr. 12, 1972

[21] Appl. No.: 243,214

[52] U.S. Cl................. 114/102, 73/178 R, 114/39, 114/144 R
[51] Int. Cl...................... B63b 49/00, G01c 21/10
[58] Field of Search.......... 114/102, 105, 39, 144 R, 114/144 C; 318/588; 73/178 R, 180, 181, 186, 187, 189, 182

[56] References Cited
UNITED STATES PATENTS
3,327,530  6/1967  Lepird .............................. 73/182
3,654,807  4/1972  Deskey ........................ 114/102 X Primary Examiner—George E. A. Halvosa
Assistant Examiner—Barry L. Kelmachter
Attorney, Agent, or Firm—Charles E. Pfund, Chittick, Thompson & Pfund

[57] ABSTRACT

A pair of wind speed sensors are mounted on opposite sides of the mast of a sailboat rigged with two sails forming a slot therebetween such that on either windward tack one of the wind speed sensors senses relative wind and the other sensor is located in the slot between the sails to sense slot wind speed. The signals representing relative wind speed and slot wind speed are differentially compared to obtain a signal that represents the increase in wind speed in the slot relative to the relative wind speed and approximately independent of incremental changes in relative wind speed. By observing the change in slot wind speed upon adjustment of the sails a sail setting can be selected to give maximum slot wind speed.

14 Claims, 8 Drawing Figures

PATENTED APR 9 1974 3,802,372
FIG. 1 FIG. 2 FIG. 3
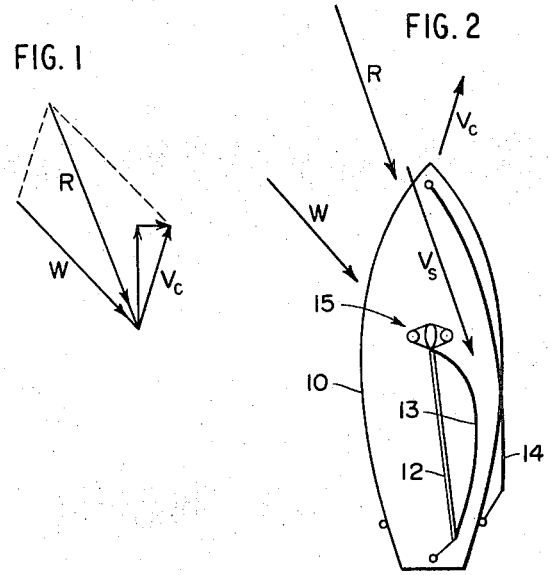
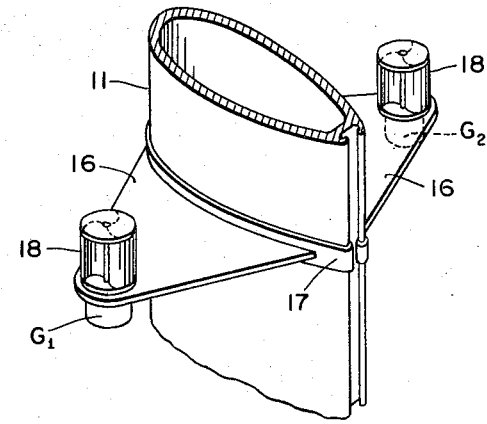
FIG. 4
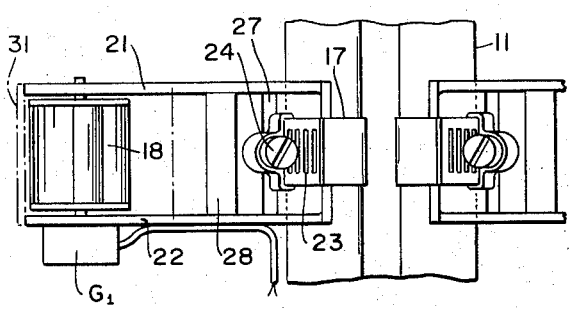
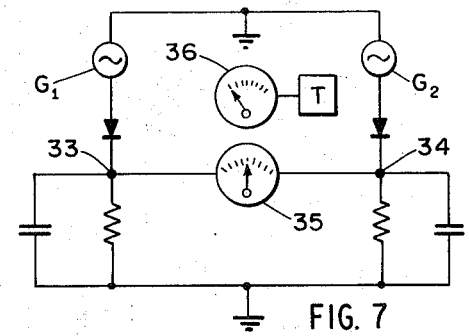
FIG. 7
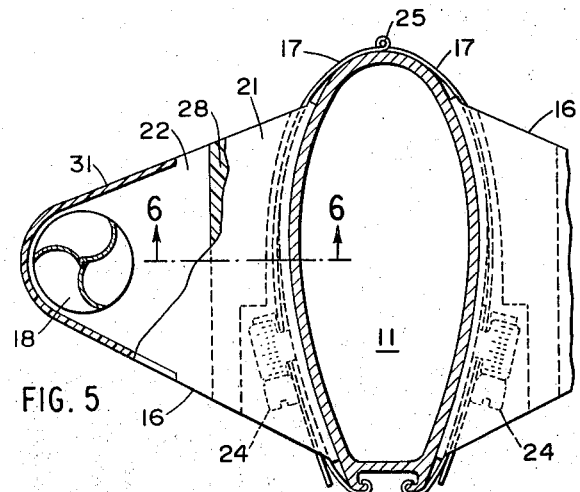
FIG. 5
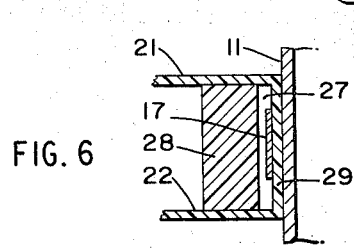
FIG. 6
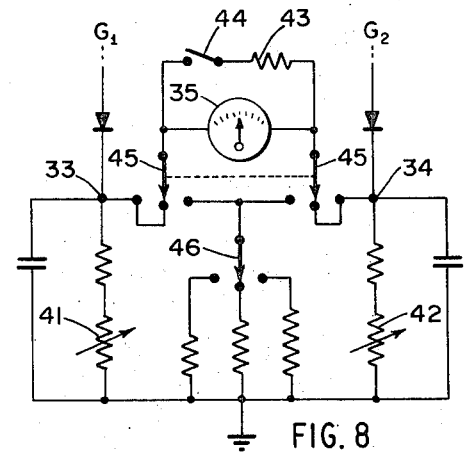
FIG. 8

METHOD AND APPARATUS FOR OBTAINING MAXIMUM SAIL WIND VELOCITY

BACKGROUND OF THE INVENTION

The adjustment of the sails on a modern sailboat having a mainsail and overlapping jib or genoa foresail to obtain maximum forward hull speed for the boat involves taking into consideration a large number of interrelated variables, many of which are constantly subject to change as the sailboat is underway. The selection of sail settings for maximum hull speed when the sailboat is on a windward tack is a matter requiring a high degree of skill from the helmsman and crew particularly if maximum performance on course is required as in competitive racing where the windward leg of the contest is generally conceded to be the most critical phase of the competition.

Generally, the helmsman relies primarily upon his knowledge and experience to adjust the mainsail and jib in relation to the heading of the craft with respect to the prevailing wind. As a quantitative indication, various forms of relative wind or through the water hull speed indicators may be employed. One of the difficulties of the helmsman's self-evaluation of his performance from moment to moment as the craft progresses on the selected course is that the wind, water, heading and sail setting variables are all generally interrelated and subject to independent variation throughout the voyage. On the other hand, the quantitative indication of hull speed by means of some sensor on the hull that is in contact with the water necessarily involves a time lag to indicate the result of a given adjustment in any of the variables available to the helmsman for adjustment such as sail setting since the increment of force resulting from a change in setting requires a certain amount of time to alter the momentum and thus the speed of the sailboat. Where relative wind speed indications are used as a guide, these readings, of course, are directly influenced by changes in both the wind speed and wind direction as well as the heading direction of the craft with respect to a constant wind velocity. There is thus in the prior art no rapidly responsive instrument for indicating factors directly related to the driving force which determines the forward speed of the boat and which is relatively independent of changes in wind and heading variables.

BRIEF SUMMARY OF THE INVENTION

In accordance with the present invention the relative wind is sensed and the wind speed in the slot formed between the mainsail and jib is also sensed to obtain two variables, one of which is related by a factor to the other. Thus the slot wind speed is generally equal to the relative wind speed times some factor $n$, where $n$ is the efficiency of the slot configuration to accelerate the wind and produce a higher velocity in the slot than the wind moving outside the slot. Since the lift on the mainsail is directly proportional to the wind speed over the convex surface of the mainsail, slot wind speed is directly proportional to the driving force on the hull and this quantity also varies directly with the relative wind speed. By differentially comparing these two quantities particularly by subtracting the relative wind speed from the slot wind speed a quantity is obtained directly related to the factor $n$ and if this factor is maximized the driving force on the boat is correspondingly a maximum. At the same time changes in the relative wind speed effect both quantities in the same manner so that the slot wind speed factor $n$ is independent of actual changes in the relative wind speed to a first approximation.

It is accordingly a principal object of the present invention to provide a method for indicating when the adjustment of the sails of a sailboat have been set to maximize slot wind speed between the sails, thereby maximizing the driving force on the hull.

A further object of the invention is to provide an instrument for sensing relative wind speed and slot wind speed for either starboard or port tack with instrumentation for differentially comparing the signals representing these wind speeds thereby to provide an indication which can be used to adjust the sails in an optimum manner.

A further object of the invention is to provide a simple and efficient instrument for measuring wind speed which can be attached with a sensor on opposite sides of the mast of a sailboat positioned to measure either relative wind speed or slot wind speed for the starboard and port tack with instruments for comparing and utilizing the signals sensed by such sensors.

BRIEF DESCRIPTION OF THE DRAWINGS

FIG. 1 is a vector diagram showing the relation between various vectors involved in a sailboat sailing on the wind.

FIG. 2 is a top plan view of a Marconi rig sailboat showing the vectors of FIG. 1 and the additional vector representing slot wind velocity.

FIG. 3 is a fragmentary view of a sailboat mast showing wind sensors attached in accordance with the present invention.

FIG. 4 is a fragmentary rear elevation view of a sailboat mast with a modified form of support for wind sensors in accordance with the invention.

FIG. 5 is a top plan view partly in section of the embodiment shown in FIG. 4.

FIG. 6 is a partial sectional view taken on line 6—6 of FIG. 5.

FIG. 7 is a schematic circuit diagram of one form of indicator circuit in accordance with the invention.

FIG. 8, is a schematic circuit diagram of a modified indicator circuit in accordance with the invention.

DESCRIPTION OF THE PREFERRED EMBODIMENT

Referring to FIG. 1, a sailboat moving with velocity $V_c$ relative to wind Vector W is subject to the force of the relative wind R which acts on the sails of the boat. The vector $V_c$ can be resolved into orthogonal components along the heading and transversely thereto representing the side slip of the craft as it progresses in the direction $V_c$.

In FIG. 2, a sailboat having a Marconi rig is shown in top plan view as comprising a hull 10, a mast 11, boom 12, mainsail 13, and jib or genoa 14. The sailboard 10 moves in the direction $V_c$ which is different than its heading direction by the amount of side slip as indicated in FIG. 1 with the angle between $V_c$ and the wind direction W generally being approximately 45° when beating to windward. As a result of the velocity of the sailboat 10, the relative wind acting on the sails corresponds to the vector R. The presence of a foresail produces a slot effect and the wind velocity is modified in the volume between the convex surface of the mainsail 13 and the concave surface of the jib 14. In this volume the wind will be accelerated to move at some high velocity $V_s$ as indicated in FIG. 2. Ideally the flow is laminar thus the velocity $V_s$ varies from point to point both in direction and magnitude.

As shown in FIG. 2, a pair of wind sensors generally indicated at 15 attached symmetrically on opposite sides of the mast 11 will be in positions where one of the sensors will be subject to the relative wind and the other sensor will be well positioned within the slot between the sails 13 and 14 to measure the magnitude of the vector $V_s$ at the position in which it is located. In FIG. 2 the craft is shown being on port tack and the left or port sensor will measure the relative wind while the right or starboard sensor will measure the slot wind velocity. It is apparent for starboard tack the quantities measured by the two sensors are interchanged.

Referring now to FIG. 3, a more detailed showing of the placement of the symmetrical wind sensors can be seen. On the mast 11 a pair of triangular shaped rigid plates 16 are mounted by means of a tension band 17. The base of the triangular plate 16 may be contoured to fit the curvature of the mast and at the apex of the triangle a pair of wind rotors 18 are symmetrically mounted. The rotors 18 respectively drive tachometer generators $G_1$ and $G_2$ which generators produce an electric signal having a characteristic such as voltage or frequency that varies directly with the speed of the rotors 18 and thus directly with wind speed to which the respective rotors 18 are responsive. It should be noted that the present invention is not limited to wind rotor and tachometer generator wind speed sensors, but any suitable devices capable of sensing wind speed and producing signals representative thereof may be employed in the approximate locations indicated in FIG. 3. Thus Pitot tubes and various other wind pressure sensors may be employed and in such embodiments the signals need not necessarily be electric since the hydraulic equivalent of the sensor and circuit arrangements here disclosed as electrical may readily be used to practice the invention.

Referring to FIG. 4, a modified form of mounting for the wind rotor 18 is shown comprising a pair of plates 21 and 22 to support top and bottom bearings in which the rotor shaft is journalled thereby providing a considerably more rugged support for the rotor 18, particularly with reference to the jib when the sailboat is coming about. As is well known in sailboat practice when tacking the jib 14 upon coming about rubs across the mast until it passes from one side of the mast to the other as the bow of the sailboat passes through the wind. By providing both upper and lower bearing supports for the shaft of rotor 18 the force of the jib bearing against the rotor 18 will be more easily accommodated without damage such as bending the rotor shaft which may occur where the cantilever support of the rotor 18 indicated in FIG. 3 is used. In either event, the use of the triangular plates 21 and 22 in FIG. 4 (or plate 16 in FIG. 3) in the shape shown provides an edge guide for the jib to guide it safely around the rotor 18 as the sail rubs thereagainst during the coming about maneuver.

As indicated in FIG. 4, the tension band 17 is slotted at 23 to provide thread engagements with an adjustment screw 24. This construction generally corresponds to a well known hose clamp structure available from the Murray Corporation. As shown in FIG. 5, a simple mounting for the device of FIG. 4 can be achieved by separating the tension band 17 into two halves connected by hinge pin 25 and providing fixed anchoring hooks 26 at the aft surface of the assembly for hooking over the edge of the mainsail track in the mast 11. By anchoring the hooks as indicated at 26 in FIG. 6 and attaching the band 17 with the hinge pin 25 the assembly can be securely mounted to the mast by tensioning the band 17 upon tightening adjustment of the screws 24.

As indicated in FIG. 6, the tension band 17 secures the assembly of plates 21 and 22 to the mast 11 by passing through a slot 27 in the plate assembly. For rigidity the plates 21 and 22 may be secured to a block 28 and a base 29. The whole support assembly except for the band 17 is preferably constructed of plastic material which is resistant to salt and sun environmental conditions. The metal parts 17, 24, 25 and 26 should of course be made of stainless steel or other non-corrosive metal.

To further protect the rotors 18 and to minimize wear it is preferable to provide a cover which will fit around the rotors when they are not in use and keep them from idly rotating in the wind. Such a cover is indicated in FIG. 5 at 31 in the form of a generally C-shaped cylindrical surface which snaps into mating grooves in the edge of the plates 21 and 22. When in place the covers 31 prevent the rotors 18 from being exposed to the wind.

Referring to FIG. 7, a circuit in accordance with the invention is shown connected to the tachometers $G_1$ and $G_2$. These generators may generate a voltage, the magnitude of which is directly proportional to wind speed. Alternatively, some other characteristic of the electrical signal generated may be proportional to wind speed such as frequency, for example. In any event, the generated signal magnitude is converted at points 33 and 34 into DC voltages which are the analogs of the wind speed at the sensors $G_1$ and $G_2$. The voltages at points 33 and 34 are differentially compared or subtracted by a zero center meter 35 connected to points 33 and 34. With the circuit indicated, the meter 35 will read or indicate a quantity equal to the difference in the wind speed signals obtained from generators $G_1$ and $G_2$. Depending upon whether the craft is on port or starboard tack, the indicator 35 will deflect on opposite sides of its zero center position. By adjusting the setting of the jib 14, the slot wind speed can be maximized by the indication of maximum deflection of the meter 35. To obtain the optimum setting of both the mainsail and jib, an indicator 36 which is related to boat speed may be provided. The indicator 36 may be any form of device responsive to a given sensing device T and for example may be a wind speed meter or a water speedometer type indicator. By making a succession of adjustments of the position of the boom 12 to set the mainsail and for each setting of the mainsail adjusting the jib 14 to obtain a maximum on meter 35, it will be possible to observe which setting of the mainsail produces maximum boat speed as indicated on the indicator 36. When the indicator 36 is maximized and the indicator 35 also indicates a maximum the optimum setting of the sails for the given condition exists. Obviously, the setting of the jib for an approximately correct setting of the mainsail requires only that the reading on the meter 35 be maximized so the use of the indicator 36 is not an essential feature of the invention in its basic form.

Referring to FIG. 8, the meter circuit of the type shown in FIG. 7 is refined in various aspects. Essentially, the meter when connected as shown to measure the differential voltages between points 33 and 34 operates as a bridge-type circuit and in FIG. 8 adjustable resistors 41 and 42 are provided for initial calibration and balancing of the bridge. In addition the meter 35 may be provided with different range scales by means of a shunt 43 selected by closing switch 44. Finally, the meter 35 may be used to measure the wind speed signal from either of the generators $G_1$ or $G_2$ by means of a double-pole, three-position switch 45. When switch 45 is placed on the left hand contact, meter 35 reads the wind speed quantity measured at $G_1$ while when the switch 45 is placed on the right hand contacts the meter 35 reads the wind speed quantity measured by $G_2$. The range of wind speed values can be selected by means of a plurality of multipliers selected by switch 46. With the switching arrangement shown in FIG. 8, a single indicator 35 can be used to indicate the differential value between the voltages at points 33 and 34 which as hereinbefore described is directly related to the slot wind speed factor $n$ or the amount of increase in wind speed which the slot generates relative to the relative wind. This quantity as previously described is to a first approximation independent of changes in wind speed and heading since the relative wind as well as the slot wind speed change by approximately the same amount and such changes are cancelled out of the differential measurement. On the other hand, with the switch 45, either one of the tachometers $G_1$ and $G_2$ can be used as the relative wind speed indicator depending upon whether the craft is on starboard or port tack. Additionally, the actual wind speed in the slot can be measured by using the switch 45 to select for measurement the generator which is positioned in the slot for the given tack.

Various modifications in the invention will be apparent to those skilled in the art. For example, the invention is as readily applicable to other sets of sails which form a slot and thus is not limited to the slot formed between the mainsail and jib. As previously mentioned, the invention is also not limited to rotor generator type wind speed sensors but can be implemented with any form of wind speed sensor. Furthermore, the exact positioning of the sensors may be improved for off the wind sailing indication by canting the triangular supports slightly forward from the mast center line so that the slot sensor is not completely shielded by the mast when the craft is on a reaching course. Similarly the wind sensors are able to indicate the maximum lift on the mainsail when used without a jib since the differential indication results from the wind velocity difference produced by the mainsail acting as an airfoil. These and other modifications will be apparent to those skilled in the art and the invention, accordingly, is not to be considered as limited to the specific disclosed embodiments but only by the scope of the appended claims.

I claim:

1. In a sailboat the method of adjusting a set of sails forming a slot comprising the steps of:
   sensing the relative wind speed outside said slot;
   sensing the wind speed of said slot;
   differentially comparing the two sensed values of wind speed;
   indicating the magnitude of the difference between said values approximately independent of incremental changes in relative wind velocity; and
   relatively adjusting the sails of said set of varying said slot to maximize said magnitude as an indication of maximum difference between said two sensed values of wind speed corresponding to maximum slot wind speed.

2. The method according to claim 1 in which said set of sails comprises a mainsail and a jib and said adjustment to vary said slot is repeated for successive settings of said mainsail; indicating a quantity related to boat speed; and selecting the mainsail setting which makes said quantity related to boat speed a maximum in conjunction with said indication of maximum difference between said two sensed values of wind speed.

3. Apparatus for sensing slot windspeed factor on a sailboat having a mast, a mainsail on said mast and a jib forming a slot between said mainsail and said jib comprising:
   wind speed sensors mounted substantially symmetrically on opposite sides of said mast; and
   means for differentially comparing the magnitude of wind speed sensed by said sensors.

4. Apparatus according to claim 3 in which said wind speed sensors are mounted on transverse supports extending laterally on opposite sides of said mast.

5. Apparatus according to claim 4 in which said sensors each comprise a wind driven rotor and a tachometer generator driven by said rotor for generating an electric signal having a characteristic which varies in accordance with rotor speed.

6. Apparatus according to claim 5 in which said supports comprise generally triangular shaped plates having the base secured to the side of the mast and said rotor mounted at the apex within the outline of said plate such that the edges of said plates act as a fairing to guide said jib past said rotor when said sailboat is coming about.

7. Apparatus according to claim 6 and including cylindrical shape covers adapted to fit on said plates over said rotors when said apparatus is not in use.

8. Apparatus according to claim 5 which includes an indicator responsive to the difference in magnitude of said characteristic of said electric signals from said sensors.

9. Apparatus according to claim 8 in which said characteristic is voltage and said indicator is responsive to the voltage difference between said sensors.

10. Apparatus according to claim 9 and including switch means selectively operable for switching said indicator to be responsive to the voltage from either one of said sensors.

11. Apparatus accordingly to claim 9 in which said indicator is a zero-center meter for indicating said voltage difference for both starboard and port tack.

12. Apparatus for indicating a quantity related to the driving force on a sailboat having a mast and mainsail comprising:
   means for sensing a variable related to windspeed at substantially symmetrical positions on opposite sides of said mast; and
   means differentially responsive to the sensed values of said variables on opposite sides of said mast for indicating said quantity related to driving force.

13. Apparatus according to claim 12 in which said means for indicating comprises means for indicating the difference between said values of said variables sensed on opposite sides of said mast automatically for both starboard and port tack.

14. Apparatus according to claim 13 in which said means for indicating is a zero-center meter and said sensed values are like polarity voltages of opposite relative magnitude, respectively, for starboard and port tack.

* * * * *